July 19, 1949.　　　　F. M. TOMLINSON　　　　2,476,781
MACHINE TOOL CHUCK ACTUATOR
Filed Sept. 6, 1944　　　　　　　　　　　　　3 Sheets-Sheet 1

INVENTOR.
Fay M. Tomlinson
BY
Kwis Hudson Boughton & Williams
ATTORNEYS

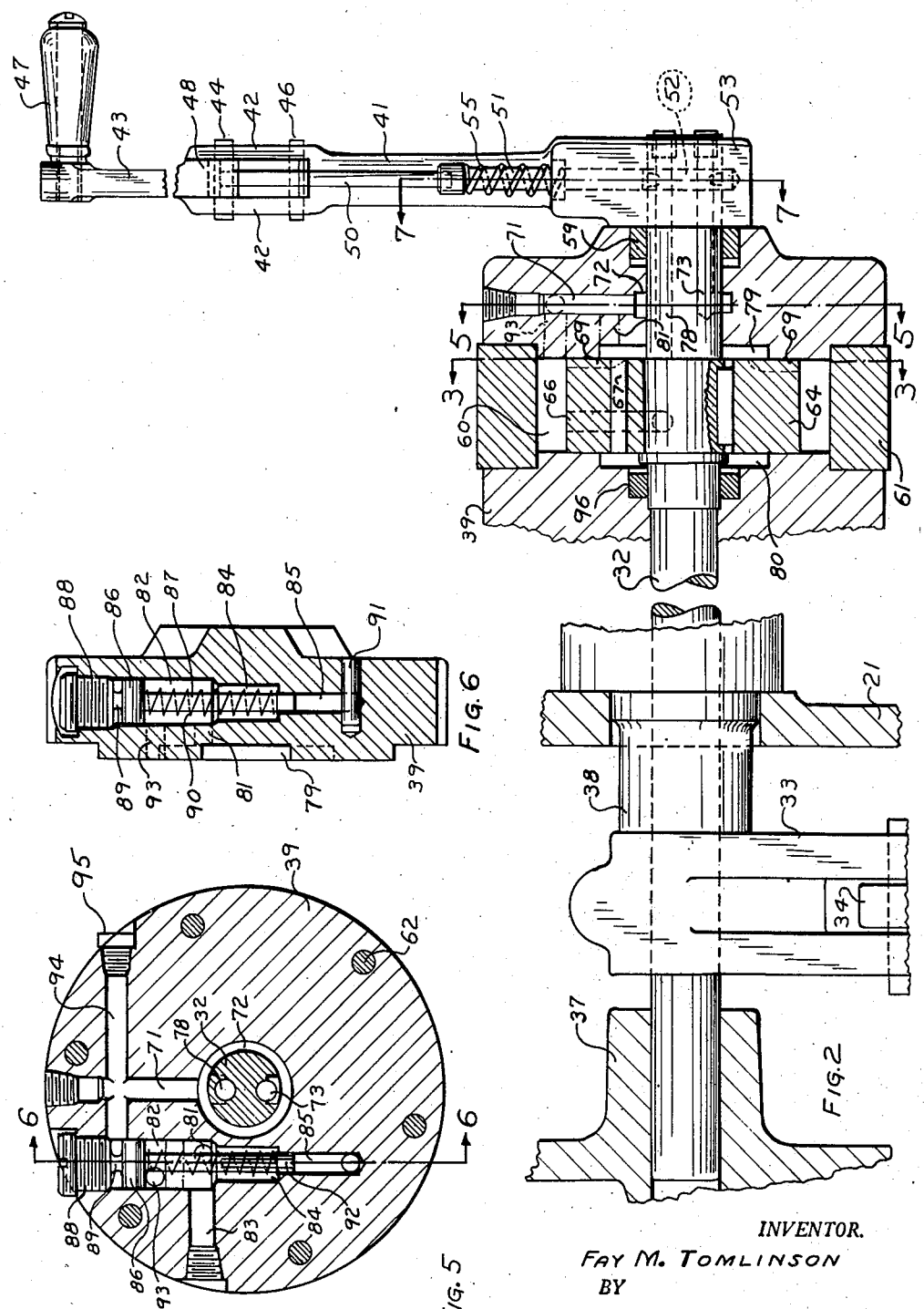

July 19, 1949.　　　F. M. TOMLINSON　　　2,476,781
MACHINE TOOL CHUCK ACTUATOR
Filed Sept. 6, 1944　　　3 Sheets-Sheet 3
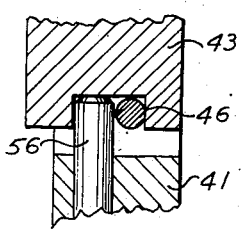
FIG. 10
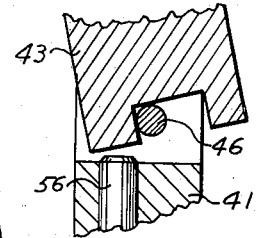
FIG. 11
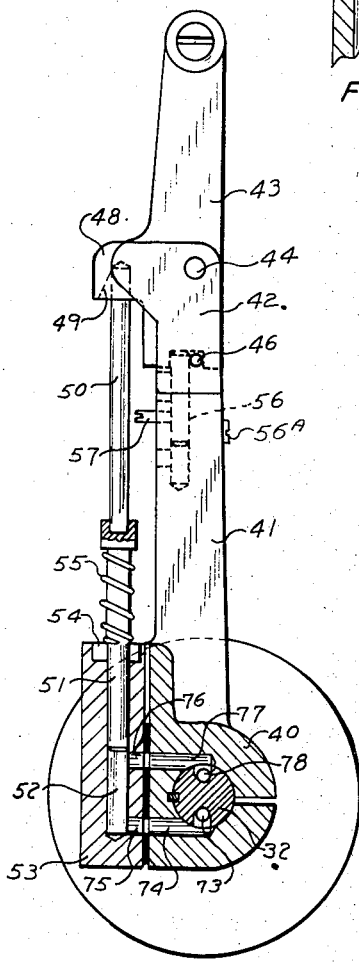
FIG. 7
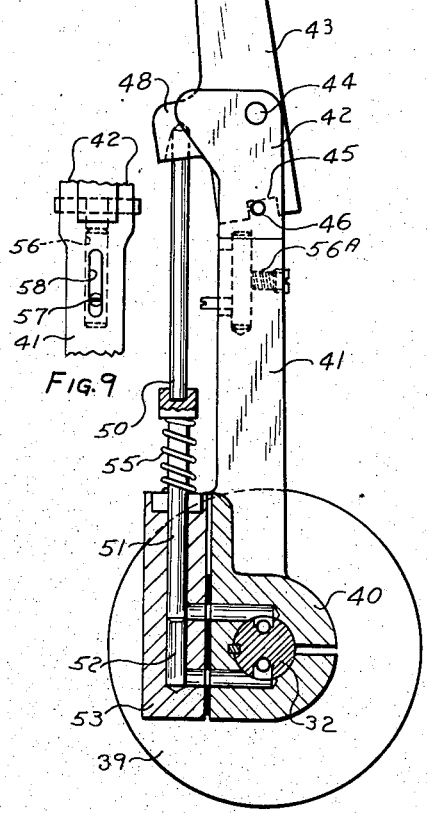
FIG. 9
FIG. 8
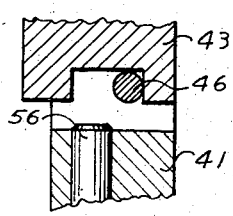
FIG. 12
INVENTOR.
FAY M. TOMLINSON
BY
*Kwis Hudson Boughton & Williams*
ATTORNEYS Patented July 19, 1949

2,476,781

UNITED STATES PATENT OFFICE 2,476,781

MACHINE TOOL CHUCK ACTUATOR

Fay M. Tomlinson, Lakewood, Ohio, assignor to The Warner & Swasey Company, Cleveland, Ohio, a corporation of Ohio Application September 6, 1944, Serial No. 552,866

19 Claims. (Cl. 279—4)

This invention relates to a machine tool and more particularly to means for operating the chuck closing and opening mechanism of a machine tool.

Heretofore machine tools have had the mechanism for opening and closing a chuck operated entirely manually or entirely by power-driven means. In the manual operation of the chuck opening and closing mechanism of a machine tool, frequently a considerable degree of force is required to operate such mechanism to effect adequate closing of the chuck jaws to properly grip the element held by the chuck. It may be difficult for the operator of the machine tool to manually apply the necessary force to correctly close the chuck and furthermore the operator may believe the requisite force has been applied to properly close the chuck when as a matter of fact such is not the case.

An object of the present invention is to provide in the manually operated chuck actuating mechanism of a machine tool, power means for supplementing the manual force applied to such mechanism by the operator in actuating the mechanism to close the chuck.

Another object is to provide an arrangement such as specified in the last mentioned object and wherein the power means becomes effective automatically to supplement the manual force applied to the chuck actuating mechanism when the resistance to the manual actuation of said mechanism reaches a predetermined amount.

A further object is to provide in the manually operated chuck actuating mechanism of a machine tool, means for supplementing the manual force applied to such mechanism by the operator in order to close the chuck with a power produced force and wherein the operator in actuating the chuck closing mechanism only needs to manually move the actuating member in the regular and customary manner.

A further object is to provide in a manually operated chuck actuating mechanism of a machine tool, power means for supplementing the manual force applied to such mechanism by the operator and which power means may be mounted directly on the manually operated shaft or movable part of the mechanism that has the operating handle or member connected thereto.

A still further object is to provide in a manually operated chuck actuating mechanism of a machine tool a hydraulic motor for supplementing the manual force applied to such mechanism by the operator and which motor may be connected to the pressure lubricating system of the machine tool.

A still further object is to provide in a manually operated chuck actuating mechanism of a machine tool, a fluid motor booster therefor, the operation of which motor is controlled by valves which, in turn, are controlled by the movements of the manually operated control handle of the mechanism.

A still further object is to provide an arrangement such as specified in the hereinbefore stated objects and which is simple in design and construction.

Further and additional objects and advantages not hereinbefore specified will become apparent during the detailed description of an embodiment of the invention which is to follow.

Although the invention may be embodied in the manually operated actuating mechanism of different types of chucks used in various machine tools, it will be described herein as embodied in the manually operated actuating mechanism of a collet chuck mounted in a rotating spindle of a machine tool.

Referring to the accompanying drawings illustrating such embodiment of the invention, Fig. 1 is a somewhat diagrammatic view showing in section a portion of a work spindle of a machine tool such as a lathe and having a collet chuck mounted therein, with certain portions of the chuck actuating mechanism also shown in section while other parts thereof are shown in front elevation; the full line illustration of the relation of the parts of the actuating mechanism being the position they occupy when the collet chuck is closed and is gripping the stock, while the dash and dot line illustration of such parts is the position they occupy when the collet chuck is open and the stock is free to be fed therethrough.

Fig. 2 is a longitudinal sectional view through that portion of the chuck actuating mechanism which includes the manually operated handle and the rockable shaft.

Fig. 5 is a transverse sectional view taken substantially on line 5—5 of Fig. 2, looking in the direction of the arrows.

Fig. 6 is a sectional view taken substantially on line 6—6 of Fig. 5, looking in the direction of the arrows.

Fig. 7 is an elevational view of the manually operated handle taken looking from the right hand end of Fig. 2, with certain portions of the handle shown in section taken along the line 7—7 of Fig. 2 looking in the direction of the arrows.

Fig. 8 is a view similar to Fig. 7 but illustrating a different relationship of the relatively movable parts of the operating handle.

Fig. 9 is a fragmentary side elevational view of the operating handle taken looking from the left side of Fig. 8.

Fig. 10 is a fragmentary sectional view on a larger scale showing the relationship of the parts of the handle as shown in Fig. 7.

Fig. 11 is a view similar to Fig. 10 but showing the relationship of the handle parts as shown in Fig. 8; and Fig. 12 is a view similar to Fig. 10 with the locking pin withdrawn.

Figure 1:
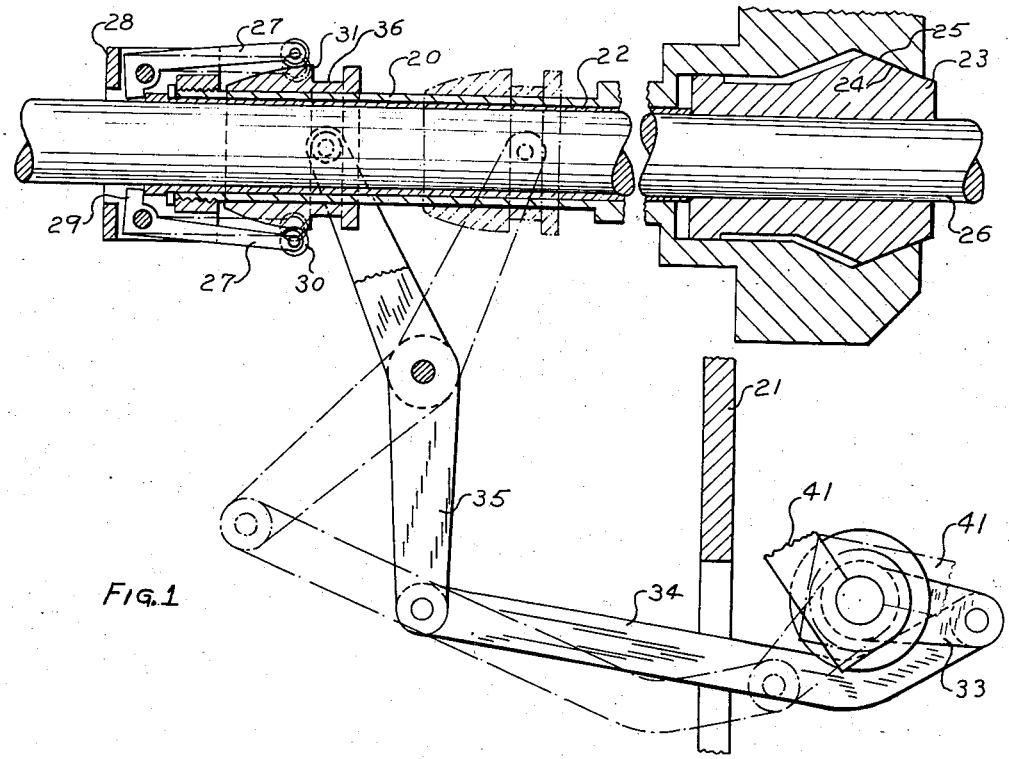

As previously stated, the invention may be embodied in the manually operated actuating mechanism of various forms of chucks used in different types of machine tools and the application of the invention to the manually operated actuating mechanism of a collet chuck is merely by way of illustration and not by way of limitation. Also by way of illustration, the collet chuck is shown as mounted in the rotatable work spindle 20 of a lathe and which spindle is supported in the headstock of the lathe as will be well understood in the art, a portion of which headstock and the bed by which it is carried being indicated in Fig. 1 at 21. The spindle 20 houses an endwise movable collet operating sleeve 22 which when moved in one direction shifts the collet 23 to cause the cooperating inclined surfaces 24 and 25 to move the spring jaws of the collet into gripping relation with the stock 26, as will be well understood in the art. When the pressure on the collet operating sleeve 22 is released the spring jaws of the collet cause the collet to shift in the opposite direction with a resulting opening of the collet jaws and an endwise movement of the sleeve 22 in said opposite direction, as will be well understood in the art.

The collet actuating sleeve 22 is moved to cause the collet to grip the stock by means of fingers 27 pivoted in a supporting element 28 secured to the spindle 20. The fingers 27 have heel portions 29 which engage the left hand end of the sleeve 22 and said fingers are provided also with rollers 30 which cooperate with a collet actuating cone 31 that is slidable axially of the spindle 20. When the cone 31 is in the position shown by dot and dash lines in Fig. 1, the collet jaws are open and the stock 26 may be fed through the spindle by any suitable means not disclosed but well understood in the art. When the cone 31 is in the full line position of Fig. 1 the collet jaws are closed and the collet is tightly gripping the stock and machining operations can be performed on the latter. It will be seen that as the cone 31 moves from the dot and dash line position of Fig. 1 toward its full line position therein, the cone surface of the cone contacts the rollers 30 and spreads the fingers 27 apart to cause the heel portions 29 thereof to shift the sleeve 22 toward the right as viewed in the drawing to effect closure of the collet. The contour of the cone 31 is so designed as to provide the proper leverage and impart closing movements to the collet jaws, it being noted that the cone 31 is provided with a cylindrical portion on which the rollers 30 rest when the collet is fully closed. The feeding of the stock when the collet is released takes place as the cone 31 is moving from the dash-dot line position of Fig. 1 toward the left and to a position where the rollers 30 first contact the conical surface of the cone. The construction just described is well known in the art and need not be explained in greater detail.

The cone 31 is shifted axially of the spindle 20 to effect opening and closing of the collet by the rocking movement of a shaft 32 which is suitably supported below the headstock in the bed and projects horizontally from the front side of the bed as will be well understood. The rocking movements of the shaft 32 may be transmitted to the cone 31 to impart axial shifting movements thereto by various forms of mechanisms well known in the art.

In Figs. 1 and 2 the shaft 32 is shown as operatively connected to the cone 31 by means of a short double lever arm 33 fixed at one of its ends to the shaft 32 within the bed of the machine and having its free end pivotally connected to the angular end of a link 34. The opposite end of the link 34 is pivotally connected to one end of a lever 35 that is pivotally supported intermediate its ends on a support carried by the headstock. The lever 35 at its upper end is provided with a fork which straddles the cone 31 and has rollers engaging in the annular groove 36 formed in said cone.

The shaft 32 is rockably supported in suitable bearings 37 and 38 within the bed of the machine and, as previously stated, said shaft projects outwardly of the front side of the bed and extends into a housing 39 secured to the front side of the bed in any suitable manner as for instance by means of a flange bolted or otherwise attached to the bed. The shaft 32 projects beyond the outer end of the housing 39 and has secured to it a handle by which the operator manually rocks the shaft. This handle comprises a hub portion 40 that is secured and keyed to the shaft 32 and an upwardly extending portion 41 preferably formed integral with the hub portion 40. The upper end of the portion 41 is forked as indicated at 42 and into this fork extends the lower end of a handle lever arm 43 that is pivotally connected to the fork as indicated at 44. The lower end of the lever arm 43 is provided with a notch 45 that straddles a pin 46 fixed in the fork 42 of the handle portion 41 and acts to limit the rocking movement in opposite directions of the lever arm 43 about its pivot 44.

The lever arm 43 at its upper end is provided with the usual hand grip element 47 while intermediate its ends and substantially in line with the pivot 44 said lever arm has an extended lug-like part 48, the underside of which is provided with a recess 49. The upper end of a vertically extending rod 50 is located in the recess 49, while the lower end of said rod is connected to the enlarged upper end of a slidable valve member 51 that extends into a bore 52 formed in a valve block 53 secured to the hub portion 40 of the handle, it being understood, of course, that said block 53 could be made integral with said hub portion but for manufacturing reasons it is preferred to make the same separate from the hub portion. The sliding valve member 51 extends through packing 54 carried by the valve block 53 and said member has mounted on it intermediate its enlarged outer end and the packing 54 a coil spring 55 of predetermined strength and which acts through the rod 50 to normally maintain the lever arm 43 in the position relative to the handle portion 41 that is shown in Fig. 7 and for a purpose which will later be pointed out. The portion 41 of the handle is provided with a longitudinally extending bore in which is mounted a pin 56 that can be moved upwardly into the notch 45 at the lower end of the lever arm 43 by an actuating pin 57 which extends outwardly of the portion 41 through an elongated slot 58 formed therein. The pin 56 is a locking pin and when moved to the position shown in Fig. 7 acts with the pin 46 to fill the notch 45 and lock the lever arm 43 against movement relative to the portion 41 of the handle. When said pin 56 is moved downwardly to the position shown in Figs. 8 and 9 its upper end is disengaged from the notch 45 and hence the lever arm 43 may swing within the limits of the notch 45 relative to the handle portion 41. A spring point 56a holds the pin 56 in its different positions. The hub portion 40 of the handle bears against the end of the housing 39 and against suitable packing 59 mounted in a counterbore formed in the housing and surrounding the shaft 32.

Figures 3, 4:
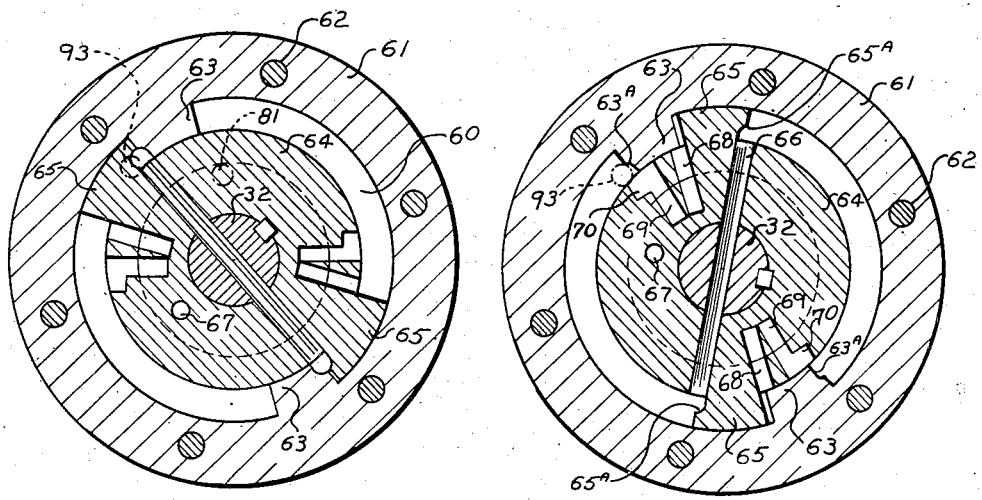
Fig. 3 is a transverse sectional view taken substantially on line 3—3 of Fig. 2, looking in the direction of the arrows, and discloses the hydraulic motor with the parts thereof in the relationship they occupy when the chuck is fully opened.
Fig. 4 is a view similar to Fig. 3 but discloses the relationship of the parts of the hydraulic motor when the chuck is fully closed.

The housing 39 includes a fluid motor now to be described. The fluid motor may be of various forms but preferably it is disclosed as a hydraulic motor of the rotary type, inasmuch as such a motor can advantageously be included as part of the housing for the shaft 32 and also can be connected to the pressure lubricating system of the headstock. The motor comprises a cylinder 61 which is rigidly connected to the other portions of the housing 39 by bolts 62 and defines an annular space 60. The cylinder 61 is concentric with the shaft 32 and is provided interiorly with a pair of radially extending abutments 63, with the abutments of said pair located diametrically opposite to each other. The abutments 63 may be formed integral with the cylinder 61, as shown, or they may be separate from said cylinder and rigidly secured thereto as will be well understood. The right hand side of one of the abutments is recessed as indicated at 63a, while the left hand side of the other abutment is similarly recessed, see Figs. 3 and 4.

The motor also includes a rotor 64 which is keyed to the shaft 32 and is of such diameter as to have its periphery slidably and rotatably engaging the arcuate inner ends of the abutments 63. The rotor 64 is provided with a pair of blades 65 which are diametrically opposed to each other and project radially outwardly of the circumference of the rotor and have their curved outer ends slidably contacting the interior of the cylinder 61. A diametrically extending passage 66 is provided through the rotor 64 and the shaft 32 with the ends of said passage located adjacent to recesses 65a formed in the blades 65. Although the blades 65 are shown as formed integral with the rotor 64 it will be understood that said blades may and probably would be separate elements from the rotor and which are fixedly secured to the rotor. The rotor 64 is provided with a passage 67 extending axially through the rotor parallel to the shaft 32. Adjacent to each blade 65 the rotor 64 is provided with grooves 68 extending inwardly of the rotor from the periphery thereof. Adjacent to the grooves 68 and angularly disposed relative thereto are grooves 69 which extend inwardly of the rotor from its periphery and which are provided at their outer ends with laterally extending portions 70. The grooves 68 and 69 may be formed in the rotor in any suitable way as, for instance, these grooves may be milled therein. The purpose of the grooves will later be pointed out.

The housing 39 intermediate the motor and the handle is provided with a passage 71 (see Figs. 2 and 5) which may be connected with a suitable source of supply of fluid under pressure as, for instance, the passage 71 may be connected to the pressure lubricating system of the machine tool by suitable connecting conduits, not shown, but which will be well understood in the art. The passage 71 extends inwardly of the housing 39 and terminates in an annular groove 72 formed in the housing and surrounding the shaft 32. A passage 73 formed in the shaft 32 is in communication with the annular groove 72 and extends longitudinally of the shaft to its outer end where it is in communication with a bore 74 in the hub portion 40 (see Figs. 7 and 8). The bore 74 communicates with a short bore 75 in the valve block 53 and said short bore 75 communicates with the valve block bore 52 adjacent the inner end of said latter bore. The bore 52 also communicates with a short bore 76 formed in the valve block 53 and spaced from the short bore 75. The short bore 76 is in alignment and communication with a bore 77 formed in the hub portion 40 and extending parallel to the bore 74. The bore 77 communicates with a passage 78 formed in the shaft 32 and extending inwardly thereof parallel to the passage 73. The inner end of the passage 78 terminates in a circular recess 79 (see Fig. 2) formed in the housing 39 and adjacent to the rotor 64, it being noted that the circumference of said recess 79 is located radially outwardly of the passage 67 through the rotor. The housing 39 is provided with a second cylindrical recess 80 of the same size as the recess 79 and located on the opposite side of the rotor 64, it being observed that the recesses 79 and 80 are in communication with each other through the passage 67 in the rotor. The cylindrical recess 79 is in communication with a short passage 81 (indicated in Fig. 3) formed in the housing 39 and said passage 81 communicates with the lower end of a counterbore 82 formed in the housing 39 (see Figs. 5 and 6). A discharge passage 83 communicates with the lower end of the counterbore 82 and the discharge passage may be connected to the return circuit of the pressure lubricating system of the machine tool by any suitable means, as will be well understood, or if a separate pressure pump is employed, to the return side of said pump.

The counterbore 82 communicates at its inner end with a smaller counterbore 84 which in turn communicates at its inner end with a bore 85. A valve 86 slides in the counterbore 82 and said valve is carried by a plunger 87 which extends through the counterbores 82 and 84 and is slidable in the bore 85. The outer end of the counterbore 82 is closed and sealed by a removable plug 88 that is screwed into the threaded outer portion of the counterbore. The inner end of the plug 88 is provided with a projection 89 that acts as a stop for the valve 86, wherefore said valve in its normal position is spaced from the inner end of the plug 88. A coil spring 90 surrounds the plunger 87 and abuts the valve 86 and the bottom of the counterbore 84 and acts to normally maintain the valve 86 in contact with the stop 89. A bore 91 is formed in the housing and extends transversely to the lower end of the bore 85 and said bore 91 is sealed by a removable sealing means, not shown, and is provided for the purpose of providing access to the lower end of the bore 85 when it is necessary in order to clean foreign matter therefrom. The plunger 87 is provided with one or more flats or grooves 92 extending longitudinally of the plunger from its inner end and for the purpose of venting air or liquid which might be in the bore 85 between the inner end thereof and the inner end of the plunger.

A short passage 93 formed in the housing 39 communicates with the counterbore 82 just inwardly of the valve 86 when said valve is in engagement with the stop 89 (see Figs. 5 and 6). The short bore 93 also communicates with the space 60 of the motor (see Fig. 2). The housing 39 is provided with a bore 94 which extends transversely to the passage or bore 71 and communicates with the counterbore 82. The outer end of the bore 94 is normally closed and sealed by a removable plug 95. The bore 94 extends to the outer periphery of the housing merely for purposes of manufacturing convenience.

The operation of the construction hereinbefore described will now be explained. Assuming that the chuck is open and the parts are in the relation shown in dot and dash lines in Fig. 1, the rotor 64 of the motor will be in the position shown in Fig. 3 while the lever arm 43 of the handle will have the relationship to the handle portion 41 indicated in Fig. 7, it being understood that the locking pin 56 has been moved to the position of Figs. 8, 11 and 12. It will also be assumed that the passage 71 is connected to the pressure side of the pressure lubricating system of the machine tool and that the bore 83 is connected to the return or discharge side thereof. At this time the pressure fluid will flow through the passage 71 into the annular channel 72, thence through the passage 73, passages 74 and 75, bore 52, passages 76 and 77, passage 78 and into the circular recess 79, the pressures in the recesses 79 and 80 being equalized due to their connection by the passage 67 extending through the rotor 64. The pressure in the recess 80 will act on the packing gasket 96 to force the same tightly into the counterbore in which it is mounted to thus effectively seal the recess 80. The pressure fluid flows from the recess 79 through the short bore 81 and into the counterbore 82, from which it is discharged through the discharge passage 83. At this time the spring 90 is maintaining the valve 86 in engagement with the stop 89, and the space 60 of the motor is in communication with the discharge passage 83 through passage 93 and counterbore 82.

The operator desiring to close the chuck grasps the hand grip 47 of the lever arm 43 of the handle and rocks said handle and the shaft 32 in an anticlockwise direction. The first part of this rocking movement of the shaft acts through the lever arm 33, link 34 and lever 35 to shift the cone 31 from its dot and dash line position of Fig. 1 toward the full line position thereof. It is during this movement of the cone that the stock may be fed through the still open chuck. This initial rocking movement of the handle does not meet sufficient resistance to overcome the spring 55 and therefore during such rocking movement the lever arm 43 remains in its straight line relationship with the handle portion 41 as shown in Fig. 7. This initial rocking movement of the shaft 32 causes the rotor to move with the shaft in an anticlockwise direction from the position shown in Fig. 3 and separates the blades 65 of the rotor from the abutments 63 of the motor cylinder. When the handle and the shaft 32 have been rocked in the anticlockwise direction sufficiently far to bring the conical surface of the cone 31 into engagement with the rollers 30 to initiate the spreading of the fingers 27 and the chuck closing movement of the actuating sleeve 22 the resistance to the rocking movement of the shaft 32 and to the handle builds up and as soon as such resistance overcomes the action of the spring 55 the lever arm 43 will rock about its pivot 44 and relative to the handle portion 41 from the position shown in Fig. 7 into the position shown in Fig. 8. This results in the lug 48 moving the rod 50 and the sliding valve member 51 until the inner end of the sliding valve member closes the short passage 76 in the valve block 53. Consequently the pressure fluid cannot now flow through the passages 76, 77, 78, recess 79, passage 81 and counterbore 82 to the discharge passage 83 as it previously did. Therefore the pressure builds up in the passage 71 and since said passage 71 is in communication with the counterbore 82 through the passage 94 the pressure builds up also in the counterbore 82 between the valve 86 and the plug 88.

As soon as this built-up pressure reaches a predetermined amount the action of the spring 90 is overcome and the valve 86 is moved inwardly of the counterbore 82 from the full time position of Fig. 5 into the dot and dash line position thereof, that is, the valve 86 moves from one side of the passage 93 to the other side thereof, with the result that said passage 93 is in communication with the passage 94 and the passage 71. As soon as this occurs the pressure fluid entering the counterbore 82 through the passage 94 flows through the passage 93 into the motor space 60 and through the diametrically extending rotor passage 66 to act equally on the blades 65 to drive the rotor in an anticlockwise direction with any fluid that is in the chamber in front of the blades 65 exhausting through the grooves 68 and 69, recess 79, passage 81, counterbore 82 and discharge passage 83. Thus the torque derived from the power drive of the motor is impressed on the shaft 32 and supplements the manual force applied to said shaft to rock the same in the anticlockwise direction until the chuck is fully closed, at which time the rollers 30 will be riding on the cylindrical portion of the cone 31. When the chuck is fully closed the rotor is in the position shown in Fig. 4, with the blades 65 again engaging the abutments 63, but the opposite sides of said abutments then are engaged by the blades in Fig. 3.

Just prior to the blades 65 engaging the abutments 63 during the anticlockwise movement of the rotor the lateral portions 70 of the slots 69 will have passed the abutments 63 and consequently the pressure fluid flowing into the chamber 60 through the passage 93 will immediately start to flow to exhaust through the grooves 69, recess 79, passage 81, counterbore 82 and exhaust passage 83. However, after the pressure fluid starts to exhaust the rotor continues slightly farther in its anticlockwise movement until the blades 65 engage the abutments, but such engagement is not effected with a hammer-like blow. Any fluid which otherwise would be compressed between the blades 65 and the abutments 63 will be discharged through the grooves 68 and into the recess 79. The chuck is now fully closed and the operator releases his grasp on the grip element 47, whereupon the spring 55 returns the lever arm 43 to the position shown in Fig. 7, with a resultant outward movement of the sliding valve 51 and the opening of the passage 76. When this occurs the pressure fluid is flowing through the passages to exhaust as previously described and the valve spring 90 comes into action to move the valve 86 to its full line position of Fig. 5 and into engagement with the stop 89, as soon as the pressure falls below the strength of said spring, wherefore pressure fluid is not entering the motor chamber 60 through the passage 93.

When the operator desires to open the chuck he grasps the grip element 47 and rocks the handle and shaft 32 in a clockwise direction until the cone 31 has been shifted from its full line position of Fig. 1 into its dot and dash line position. During this movement of the handle the lever arm 43 does not turn relative to the handle portion 41. This causes the rotor 64 to rotate in a clockwise direction from the position shown in Fig. 4 into the position shown in Fig. 3 and any fluid which might be compressed in advance of the blades 65 is discharged through the rotor passage 66 and the passage 93. It will be understood that during the entire opening of the chuck the pressure fluid is flowing through the passages to the exhaust passage 83 as originally set forth in the initial portion of the explanation of the operation of the construction.

If it is desired to operate the mechanism entirely manually the operator may move the pin 56 into the position shown in Fig. 7 to prevent any relative movement between lever arm 43 and handle portion 41, wherefore the passage 76 remains open.

From the foregoing description it will be clear that the construction embodying the invention accomplishes the objects hereinbefore set forth and provides a simple and efficient arrangement for supplementing the manual force applied to the chuck actuating mechanism in closing the chuck and does this in such a manner that the power derived force is applied automatically at the desired time and without the necessity of any unusual or other operation by the operator who merely moves the handle in the customary manner.

Although a preferred embodiment of the invention has been illustrated and described herein, it will be understood that the invention is susceptible of various modifications and adaptations within the scope of the appended claims.

Having thus described my invention, I claim:

1. In a machine tool, a support, a member carried by said support and provided with a chuck, actuating mechanism carried by said support for closing and opening said chuck and including a manually operated movable part, and a hydraulic motor including a housing stationary with respect to said support and having a movable element therein operatively connected with said part wherefore the force of said power means may be applied to said part in addition to the manual force applied thereto.

2. In a machine tool, a support, a member carried by said support and provided with a chuck, actuating mechanism carried by said support for closing and opening said chuck and including a manually operated movable part, and a fluid motor of the rotary type including a housing stationary with respect to said support and having therein a rotary element operatively connected with said part wherefore the force of said motor may be applied to said part in addition to the manual force applied thereto.

3. In a machine tool, a support, a member carried by said support and provided with a chuck, actuating mechanism carried by said support for closing and opening said chuck and including a manually operated rockable shaft, and a fluid motor of the rotary type mounted directly on said shaft with its housing stationary with respect to said support and with its rotor secured to said shaft, wherefore the force of said motor may be applied to said shaft in addition to the manual force applied thereto.

4. In a machine tool, a support, a member carried by said support and provided with a chuck, actuating mechanism for said chuck carried by said support and including a manually operated part movable in opposite directions to effect closing and opening of said part, a hydraulic motor including a housing stationary with respect to said support and having a movable element operatively connected to said part, and means functioning automatically during the manual operation of said part in one direction to render said motor active to apply the force thereof to said part in addition to the manual force applied thereto.

5. In a machine tool, a support, a member carried by said support and provided with a chuck, actuating mechanism for said chuck carried by said support and including a manually operated part movable in opposite directions to effect closing and opening of said chuck, a hydraulic motor including a housing stationary with respect to said support and having a movable element operatively connected with said part, and means functioning automatically during the manual operation of said part in a chuck closing direction to render said motor active whereby the force of said motor is applied to said part in addition to the manual force applied thereto, said means automatically rendering said motor inactive during the manual operation of said part in the chuck opening direction.

6. In a machine tool, a member provided with a chuck, actuating mechanism for said chuck and including a manually operated shaft rockable in opposite directions to effect closing and opening of said chuck, a fluid motor of the rotary type mounted on said shaft, and means operatively associated with said shaft and functioning automatically at a predetermined point in the manual movement of said shaft in the chuck closing direction to render said motor active, wherefore the force of said motor is applied to said part in addition to the manual force applied thereto, said means functioning to render said motor inactive during the manual operation of said shaft in the chuck opening direction.

7. In a machine tool, a member provided with a chuck, actuating mechanism for said chuck and including a manually operable shaft rockable in opposite directions to effect opening and closing of said chuck, a fluid motor of the rotary type mounted on said shaft, and means operatively associated with said shaft and said motor and normally rendering said motor inactive but functioning automatically during the manual operation of said shaft in a chuck closing direction and when the resistance to said operation of said shaft reaches a predetermined amount to render said motor active and apply the torque thereof to said shaft in addition to the manual force applied thereto.

8. In a machine tool, a member provided with a chuck, actuating mechanism for closing and opening said chuck and including a movable part, a manually operated handle operatively associated with said part and having two relatively movable portions, spring means acting to maintain said handle portions in normal relationship during movement of the handle to actuate said chuck until resistance to handle movement exceeds a predetermined amount, whereupon said handle portions have movement relative to each other, a motor operatively connected with said part, and means operatively associated with said motor and said relatively movable portions of said handle for controlling said motor to render the latter inactive when said handle portions are in normal relationship and active when said handle portions move relative to each other.

9. In a machine tool, a member provided with a chuck, actuating mechanism for closing and opening said chuck and including a rockable shaft, a handle operatively associated with said shaft for manually rocking the same, a fluid motor operatively connected with said shaft and valve means for controlling said motor and including a pressure actuated valve and a valve operated by said handle to closed position to cause pressure actuation of said pressure actuated valve.

10. In a machine tool, a member provided with a chuck, actuating mechanism for said chuck including a rockable shaft and a handle secured thereto for manually rocking the same, a housing for said shaft and including as part thereof a motor casing, a rotor fixed on said shaft within said casing, said casing being provided with spaced interior abutments and said rotor being provided with spaced blades and means operatively associated with said handle for controlling the admission and exhaustion of pressure fluid to said casing to actuate said rotor and said shaft.

11. A machine tool as defined in claim 10 and wherein said housing is provided with recesses on opposite sides of said rotor while said rotor is provided with an axially extending passage interconnecting said recesses.

12. A machine tool as defined in claim 10 and wherein said rotor has sliding contact with the inner ends of the abutments carried by said casing while said blades carried by said rotor have sliding contact with the interior of said casing, said rotor and shaft being provided with a diametrically extending passage interconnecting the spaces between said rotor and casing on opposite sides of said blades, said housing being provided with recesses on opposite sides of said rotor, said rotor having an axially extending passage interconnecting said recesses and being provided on one side with notches extending inwardly from the rotor periphery and communicating with one of said recesses.

13. In a machine tool, a member provided with a chuck, actuating mechanism for closing and opening said chuck and including a rockable shaft, a housing for said shaft, a handle secured to said shaft at the end of said housing for manually rocking the shaft to actuate the chuck, said housing including a fluid motor of the rotary type and having its rotor secured to said shaft, passages in said housing for supplying and exhausting pressure fluid to and from said motor, and valve means operatively associated with said passages for controlling the flow of pressure fluid therethrough and including a pressure actuated valve and a manually actuated valve.

14. A machine tool as defined in claim 13 and wherein said handle includes a portion movable relative to the remainder of said handle and within predetermined limits, a spring resisting movement of said handle portion relative to the remainder of said handle, and operative connections between said manually actuated valve and said handle portion such that relative movement of said handle portion actuates said valve to close certain of said passages and cause actuation of said pressure actuated valve to render said motor active.

15. A machine tool as defined in claim 8 and wherein means is provided for locking said handle portions in normal relationship when it is desired to operate the chuck actuating mechanism solely manually.

16. A machine tool as defined in claim 8 and wherein one handle portion is provided at its end with a fork, means pivotally mounting the other handle portion in said fork, a pin carried by the tines of said fork and extending therebetween, said other handle portion being provided with a notch straddling said pin wherefore relative movement between said portions is limited, and a movable locking pin carried by said one handle portion and movable into said notch to cooperate with said first pin and lock said handle portions against relative movement.

17. In a machine tool, a member provided with a chuck, actuating mechanism for closing and opening said chuck and including a rockable shaft, a handle operatively associated with said shaft for manually rocking the same, a motor operatively connected with said shaft, and control means for said motor and carried in part by said handle.

18. In a machine tool, a member provided with a chuck, actuating mechanism for closing and opening said chuck and including a rockable shaft, a handle operatively associated with said shaft for manually rocking the same, a fluid motor operatively connected with said shaft, and control means for said motor and including a valve operated by said handle.

19. In a machine tool, a support, a member carried by said support and provided with a chuck, actuating mechanism carried by said support for closing and opening said chuck and including a movable part, and a manually operated member operatively connected to said part, a motor having a housing stationary with respect to said support and through which housing said part extends, said motor also including a movable power responsive element within said housing and carried by said part, and control means for said motor operatively associated with said manually operated member.

FAY M. TOMLINSON.

REFERENCES CITED

The following references are of record in the file of this patent:

UNITED STATES PATENTS

| Number | Name | Date |
| --- | --- | --- |
| 1,758,844 | Long | May 13, 1930 |
| 1,834,986 | Strawn | Dec. 8, 1931 |
| 2,366,908 | Jenkins | Jan. 9, 1945 |

FOREIGN PATENTS

| Number | Country | Date |
| --- | --- | --- |
| 397,274 | Great Britain | 1933 |
| 450,881 | Germany | 1927 |